US008954176B2

(12) United States Patent
Silva (10) Patent No.: US 8,954,176 B2
(45) Date of Patent: Feb. 10, 2015

(54) EXPANDABLE MULTIMEDIA CONTROL SYSTEM AND METHOD

(75) Inventor: Michael C. Silva, East Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 1027 days.

(21) Appl. No.: 12/682,335

(22) PCT Filed: Sep. 4, 2008

(86) PCT No.: PCT/US2008/010363
§ 371 (c)(1),
(2), (4) Date: Apr. 9, 2010

(87) PCT Pub. No.: WO2009/032272
PCT Pub. Date: Mar. 12, 2009

(65) Prior Publication Data
US 2010/0280639 A1    Nov. 4, 2010

Related U.S. Application Data

(60) Provisional application No. 60/970,176, filed on Sep. 5, 2007.

(51) Int. Cl.
G06F 17/00     (2006.01)
H04L 12/28     (2006.01)
H04L 12/24     (2006.01)

(52) U.S. Cl.
CPC ........... *H04L 12/2809* (2013.01); *H04L 12/282* (2013.01); *H04L 41/5035* (2013.01); *H04L 2012/2849* (2013.01)
USPC .............. 700/94; 381/119; 715/716; 715/727

(58) Field of Classification Search
USPC ........................................... 700/94
See application file for complete search history.

(56) References Cited

U.S. PATENT DOCUMENTS 7,561,179 B2 *   7/2009   Johansen et al. ........... 348/14.09
8,291,049 B2 *   10/2012  Roos ............................ 709/219
(Continued)

FOREIGN PATENT DOCUMENTS

EP          1 355 451 A2    10/2003
WO       WO-01/08152 A1    2/2001
(Continued)

OTHER PUBLICATIONS

Yamaha DME Designer software and system: Copyright and available for sale 2004.*
(Continued)

*Primary Examiner* — Paul McCord
(74) *Attorney, Agent, or Firm* — Cesari and McKenna, LLP (57) ABSTRACT

A multimedia control system which may be expanded without creating or modifying source code. The system is based on a master programmable multimedia controller. The master programmable multimedia controller has a list of unique identifiers that indicate valid subordinate programmable multimedia controllers that are eligible to become part of the system. One or more subordinate programmable multimedia controllers having a matching unique identifier to a unique identifier on the master's list may be added to the system to provide additional control ports, increase audio or video processing or switching capacity. A method is provided for determining whether a particular subordinate programmable multimedia controller may be added to the system.

21 Claims, 4 Drawing Sheets

(56) References Cited

U.S. PATENT DOCUMENTS

| | | | |
|---|---|---|---|
| 2003/0122866 A1 | 7/2003 | Yook | |
| 2004/0246041 A1* | 12/2004 | Chung | 327/363 |
| 2005/0060700 A1 | 3/2005 | Bucher et al. | |
| 2005/0169219 A1* | 8/2005 | Serpa et al. | 370/338 |
| 2007/0068925 A1 | 3/2007 | Ohara | |
| 2007/0113184 A1* | 5/2007 | Haot et al. | 715/723 |
| 2007/0142022 A1 | 6/2007 | Madonna | |
| 2007/0197160 A1* | 8/2007 | Health et al. | 455/3.05 |
| 2008/0043110 A1* | 2/2008 | Aizawa | 348/211.2 |
| 2008/0120429 A1* | 5/2008 | Millington | 709/231 |
| 2008/0127063 A1 | 5/2008 | Silva | |
| 2008/0288284 A1* | 11/2008 | Leichner et al. | 705/2 |

FOREIGN PATENT DOCUMENTS

| | | |
|---|---|---|
| WO | WO-2006/022432 A | 3/2006 |
| WO | WO-2006/055484 A1 | 5/2006 |

OTHER PUBLICATIONS

"Notification of Transmittal of the International Search Report and the Written Opinion of the International Searching Authority, or the Declaration," International Filing Date: Sep. 4, 2008, International Application No. PCT/US2008/010376, Applicant: Savant Systems LLC, Inc., Date of Mailing: Apr. 14, 2009, pp. 1-12.

U.S. Appl. No. 11/687,511, filed Mar. 16, 2007 by Robert P. Madonna entitled System and Method for Mixing Graphics With Video Images or Other Content, 31 pages.

"Notification of Transmittal of the International Search Report and the Written Opinion of the International Searching Authority, or the Declaration," International Filing Date: Apr. 9, 2008, International Application No. PCT/US2008/0010363, Applicant: Savant Systems LLC, Inc., Date of Mailing: Jan. 20, 2009, pp. 1-13.

* cited by examiner

EXPANDABLE MULTIMEDIA CONTROL SYSTEM AND METHOD

CROSS-REFERENCE TO RELATED APPLICATIONS

The present Application claims the benefit of U.S. Provisional Patent Application Ser. No. 60/970,176, which was filed on Sep. 5, 2007, by Silva for a MULTIMEDIA CONTROL SYSTEM AND METHOD, which is incorporated by reference herein, and an International Application No. PCT/US2008/010363, which was filed on Sep. 4, 2008, by Silva for an EXPANDABLE MULTIMEDIA CONTROL SYSTEM AND METHOD, which is incorporated by reference herein.

BACKGROUND OF THE INVENTION

1. Field of the Invention

The present invention relates generally to the fields of multimedia and communications and, more specifically, to an expandable multimedia control system for home, commercial, professional audio or video, broadcast or film studio, security, automation or other use.

2. Background Information

Various multimedia control systems exist which may be used to interconnect and control a wide variety of audio, video and possibly other types of devices. Many conventional multimedia control systems require the creation or customization of at least some source code in order to initially configure a system as well as to account for subsequent changes in system components, system expansion and the like. Historically, dealers and installers, as opposed to manufacturers, were the ones confronted with the slow, costly and inconvenient task of customizing software, often through subcontract to independent software developers.

At least from the perspective of dealers and installers, there are several major disadvantages with the conventional approach. First, it is extremely difficult to control quality in connection with customized software. Dealers and installers are put in the position of relying upon independent developers to document and maintain complex systems on a per customer basis. If a customer's equipment is damaged or destroyed, it may be very time-consuming, costly or impossible to reconstruct and restore the customer's system. In addition, if something does not work, it is the dealer or installer who the customer knows and will look to for resolution.

Second, customized software may not support or may interfere with the operation of equipment that the customer wishes to add to his or her system in the future. In view of the cost and inconvenience, most customers will not be satisfied with a system which requires software customization simply to add new equipment, upgrade or expand system capacity. Such dissatisfaction negatively affects a dealer's or installer's business by reduced future sales of upgrades and new equipment.

SUMMARY OF THE INVENTION

In brief summary, the present invention provides an expandable multimedia control system and method for expanding same. The expandable system includes a master programmable multimedia controller (PMC), which is based on a general purpose computer and is capable of providing a wide variety of programmable services. The master PMC is responsive to a system configuration. The system configuration associates a unique identifier with each subordinate PMC which is eligible to become part of an expanded system. Through its own configuration information, each subordinate PMC is aware of a unique identifier that was previously assigned to that PMC.

When advertising its availability to join an existing multimedia control system, a subordinate PMC will communicate with the master PMC. The master PMC, based upon the unique identifier that a subordinate PMC advertises, will determine whether the subordinate PMC is eligible to become part of an expanded system.

The present invention provides a number of advantages including a flexible, scalable architecture which enables future expansion without creating or modifying source code. In systems where multiple programmable multimedia controllers are present and arranged in multiple zones which correspond, for example, to different areas of a house, the present invention enables programmable services available in one zone to be controlled by a user interface located in a different zone. Similarly, the present invention enables components located in one zone to be used to provide programmable services in another zone and to support a zone of shared resources or components. The present invention enables scalability of control ports and localized control of components, which substantially reduces the need for long cable runs between dispersed components and a central point.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
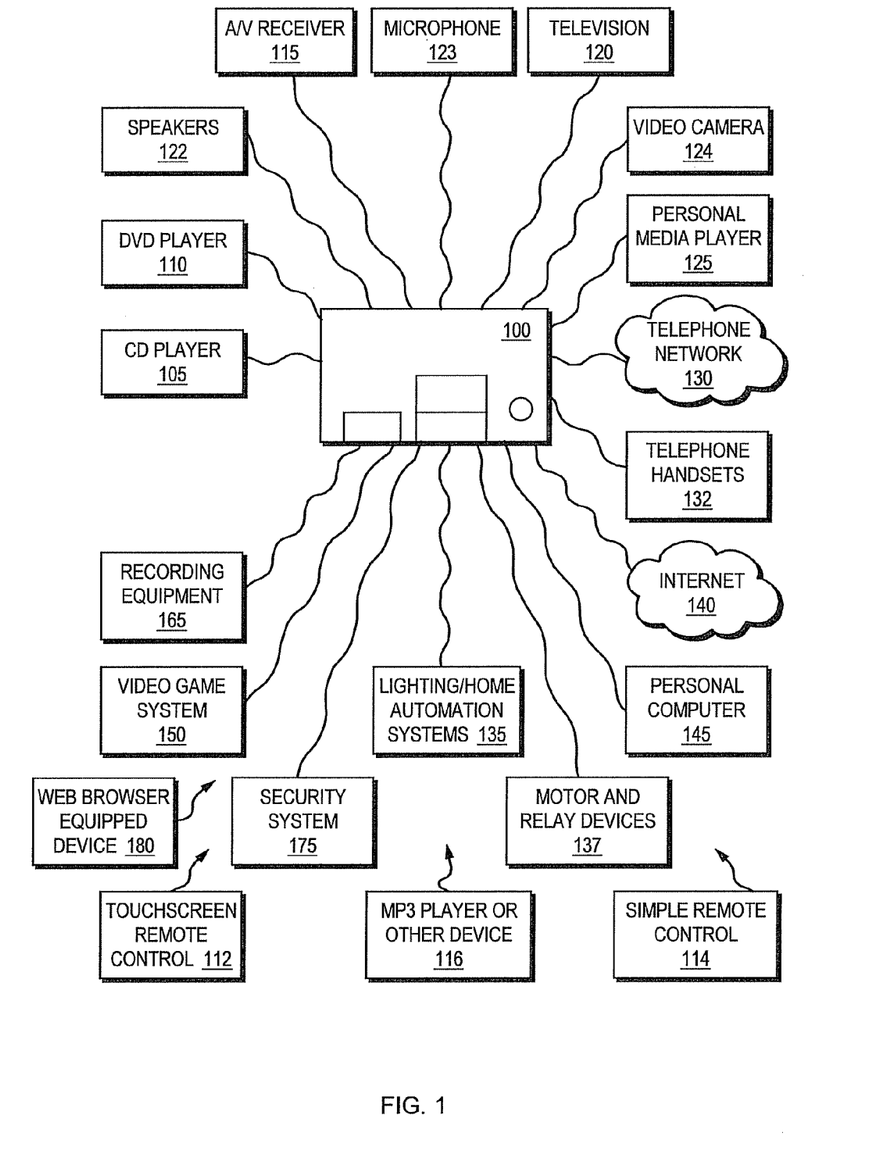
FIG. 1 is a block diagram of a programmable multimedia controller which is capable of interconnecting with and controlling a variety of devices.

FIG. 1 is a block diagram of a programmable multimedia controller 100 interconnected with a number of devices. The term "programmable multimedia controller" should be interpreted broadly as a device capable of controlling, switching data among, or interoperating with a variety of electronic devices, such as audio, video, telephony, data, security, motor-driven, relay-driven, or other types of electronic devices. By interacting with these devices the programmable multimedia controller may implement an integrated multimedia control solution.

In an illustrative embodiment, programmable multimedia controller 100 may be connected to a wide range of audio/video components, for example, a compact disk (CD) player 105, a digital versatile disc (DVD) player 110, an audio/video receiver 115, a television 120, a personal media player 125, speakers 122, a microphone 123, and a video camera 124. Programmable multimedia controller 100 may also be connected to telephony devices such as a telephone network 130 and telephone handsets 132. Telephone network 130 may be a publicly switched telephone network (PSTN), an Integrated Services Digital Network (ISDN) or other public or private telecommunications network.

In addition, programmable multimedia controller 100 may intercommunicate with variety of light or home automation systems 135. Systems 135 may operate using the X10 protocol developed by Pico Electronics, the INSTEON™ protocol developed by SmartHome, Inc., the CEBus standard managed by the CEBus Industry Council, or another well known home automation or control protocol. Similarly programmable multimedia controller 100 may be connected to motor or relay operated devices 137 that may include, for example, a heating, ventilation and air conditioning system (HVAC) system, an irrigation system, an automatic shade or blind system, an electronic door lock, or other types of devices.

A computer network, such as the Internet 140, may also be connected to multimedia controller 100. In addition, a personal computer (PC) 145, video game systems 150, home recording equipment 165 or other devices may also be connected to multimedia controller 100.

A wide variety of devices may be used as remote controls which interface with and control the operation of multimedia controller 100 and, in turn, the operations of components or systems that may be interconnected with controller 100. Such remote controls may include a touchscreen remote control 112, a simple remote control 114, which may be electromechanical, an MP3 player or other device 116, and a web browser-equipped device 180.

Web browser-equipped device 180 includes a wireless telephone handset such as an Apple® iPhone®, an Internet tablet, a notebook, laptop or other computer, or essentially any other device which is browser-enabled and has appropriate connectivity, wireless or wired, to communicate with programmable multimedia controller 100.

Such remote controls may interface with multimedia controller 100 via a wired connection, an IR link, an RF link, a Bluetooth® link, a ZigBee® link or another appropriate communication interface.

Details regarding the hardware, software, capabilities and programmability of programmable multimedia controller 100 may be found in the co-pending related applications referenced herein.

Figure 2:
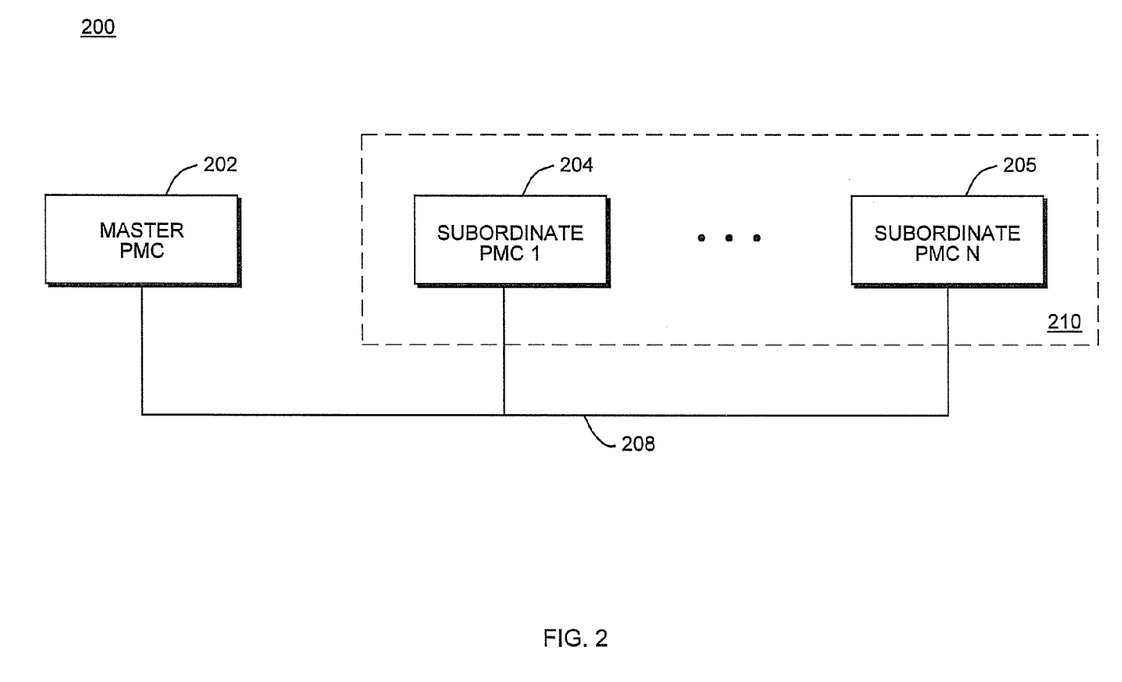
FIG. 2 is a block diagram of an expandable multimedia control system constructed in accordance with an embodiment of the present invention.

FIG. 2 shows an expandable multimedia control system 200. A master programmable multimedia controller (PMC) 202 is coupled in communicating relationship via a local area network (LAN) 208 with a first subordinate PMC 204 and optionally with one or more additional subordinate PMCs 205. For purposes of clarity, any components or devices that would normally be interconnected with any of PMCs 202-205, such as those shown in FIG. 1, are omitted.

It should be understood that, as an alternative to LAN 208, any of a number of other suitable communication links or technologies may be used including point-to-point, wired and wireless technologies.

In an illustrative embodiment, master PMC 202 includes some or all of the hardware and overall functionality as that of the programmable multimedia controller disclosed in the related, co-pending U.S. patent application Ser. No. 11/687,511, filed on Mar. 16, 2007 entitled "Systems and Method for Mixing Graphics With Video Images or Other Content", which is incorporated by reference herein.

Subordinate PMCs 204 and 205 may contain similar hardware and functionality as that of master PMC 202 or may contain only desired subsets of such hardware and functionality. In general, subordinate PMCs may be necessary or desirable in a particular installation for a variety of reasons including: to provide additional control ports (e.g., RS-232, RS-422, RS-485, IR, relay, GPIO or Ethernet) within the system as a whole; to provide additional audio processing or switching capacity; or to provide additional video processing or switching capacity. Thus, the choice of hardware and corresponding functionality to include in a particular subordinate PMC are often heavily influenced by the requirements of the particular installation.

As described in co-pending U.S. patent application Ser. No. 11/314,112, filed on Dec. 20, 2005, entitled "Programmable Multimedia Controller With Programmable Services" and U.S. patent application Ser. No. 11/520,215, filed on Sep. 13, 2006, entitled "Programming Environment and Metadata Management for Programmable Multimedia Controller," which are incorporated herein by reference, configuration of master PMC 202 may advantageously be done in a graphical programming environment. In general, as a result of the configuration process described in those co-pending applications, a set of files, referred to collectively as a "configuration bundle," representing a particular system configuration (i.e., a particular set of components or devices, arranged in particular zones, and interconnected in a particular way with master PMC 202) is created. In an embodiment, during the configuration process, a person such as a dealer or installer will specify whether a particular PMC is a master or subordinate. Such specification may be explicitly made, may occur implicitly according to where the PMC is placed in a system hierarchy or may be made otherwise.

Within the configuration bundle for master PMC 202 is information regarding any subordinate PMCs, such as subordinate PMCs 204 and 205, which are eligible to operate in conjunction with master PMC 202 as part of a possible future expansion 210 of system 200. Among other information, the configuration bundle for master PMC 202 contains a predetermined unique identifier (e.g., a number, name or value which may be considered unique within system 200) for each subordinate PMC 204 and 205 which master PMC 202 will recognize as an eligible PMC should it appear in the future.

Similar to master PMC 202, each subordinate PMC 204 and 205 receives its own configuration bundle. The configuration bundle for each of subordinate PMCs 204 and 205 includes the unique identifier (UID) for the associated subordinate PMC. Within the configuration bundle for all PMCs is information which tells the particular PMC using that bundle whether to identify itself and operate as a master or as a subordinate.

Figure 3:
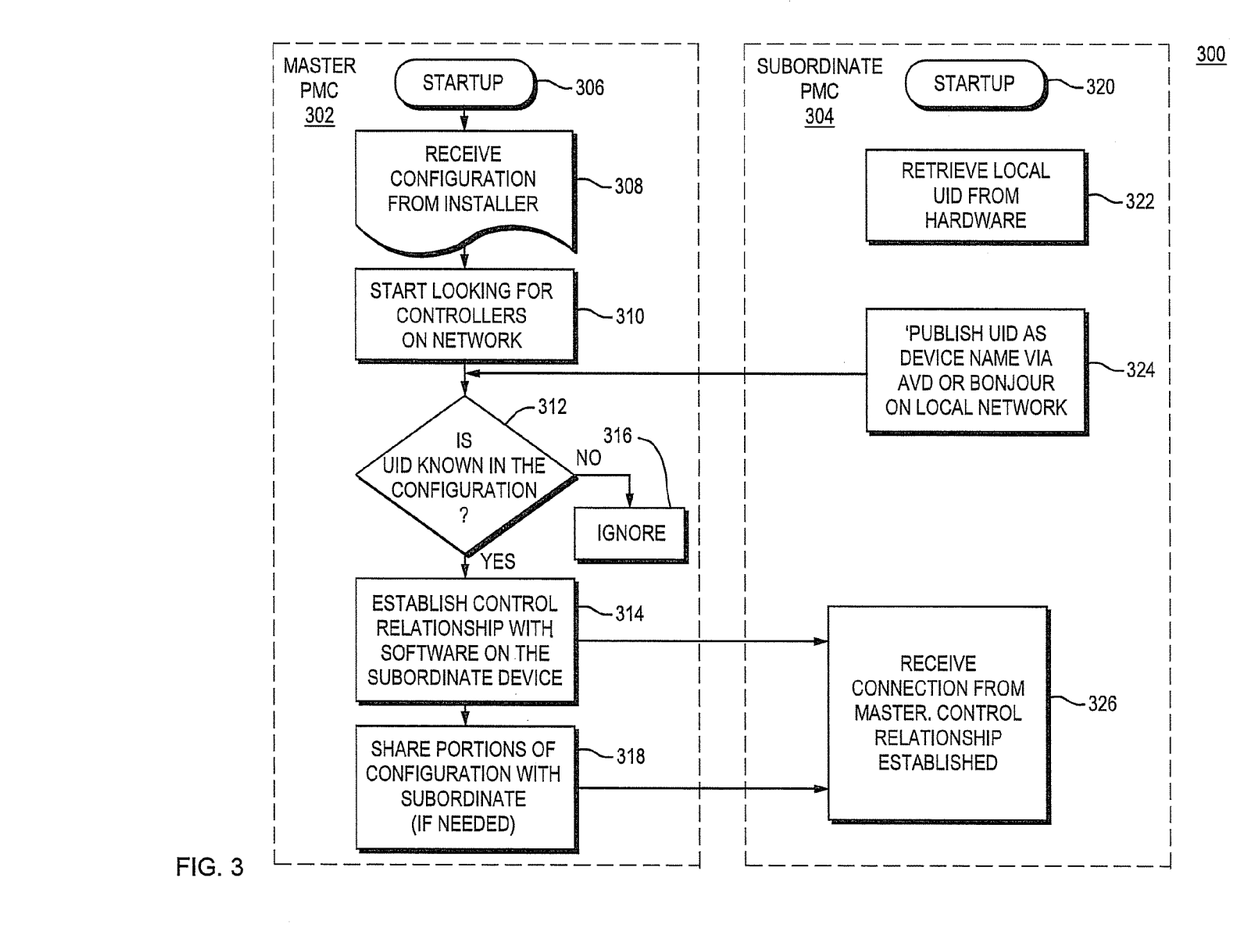
FIG. 3 is a flowchart showing a method for determining whether to add a subordinate programmable multimedia controller to an expandable multimedia control system.

FIG. 3 is a flowchart showing a method 300 for adding a subordinate PMC to an expandable multimedia control system. In method 300, processes, functions or events which are associated with a master PMC are denoted collectively by reference number 302. Similarly, processes, functions or events which are associated with subordinate PMC are denoted collectively by reference number 304.

Following any necessary preparatory actions during startup 306, a master PMC will receive its configuration bundle from an installer program at step 308. Subsequently, having determined from information in the configuration bundle that it is a master PMC, the master PMC at step 310 starts looking for other PMCs that may be present on a local network, such as LAN 208 (FIG. 2). In an embodiment, a master PMC may use Apple® Bonjour® service discovery protocol to advertise its search for other PMCs.

Meanwhile, a subordinate PMC that is connected to LAN 208 or otherwise provided with a communication link to the master PMC performs necessary preparatory actions during startup 320. From the time it was manufactured, subordinate PMC is aware of its own UID which may, for example, be a serial number stored in nonvolatile memory within the subordinate PMC. Thus, at step 322, subordinate PMC will retrieve its own UID. Next, at step 324, a subordinate PMC may "publish" its UID using either a system message (AVD), discussed below in connection with FIG. 4, or Apple® Bonjour® over LAN 208. Other wired or wireless communication protocols and technologies may be used as well.

A PMC which has not yet been configured will still preferably publish its UID. In the case of a PMC which is destined to become a master PMC, the published UID would typically be detected by a system monitor (not shown) running on a human installer's notebook or other computer. Thus, the prospective master PMC will typically receive its configuration bundle from a configuration management tool (not shown) running on the installer's computer.

In the case of a PMC which is destined to become a subordinate PMC, the published UID is essentially an indication that the subordinate PMC is available to join an existing system. As described below, assuming that the subordinate PMC is detected and recognized by a master PMC (or other supervisory entity such as a system monitor) as eligible to join the system, the master PMC will provide appropriate configuration information to the subordinate PMC.

The "published" UID 328, when received by a master PMC, is compared at step 312 to UIDs which are listed as valid in the master PMC's configuration bundle. If there is no match, then master PMC may simply ignore the published UID at step 316. An absence of a match may indicate several possible conditions including the subordinate PMC is not authentic or the PMC has an improper or out of date configuration.

Assuming that a match of UID is found at step 312, the master PMC proceeds at step 314 to establish a control relationship with the software on the subordinate PMC. Lastly, at step 318, if the master PMC determines that portions of its configuration bundle is are needed by the subordinate PMC to operate properly, the master PMC shares a copy of such portions as needed.

Figure 4:
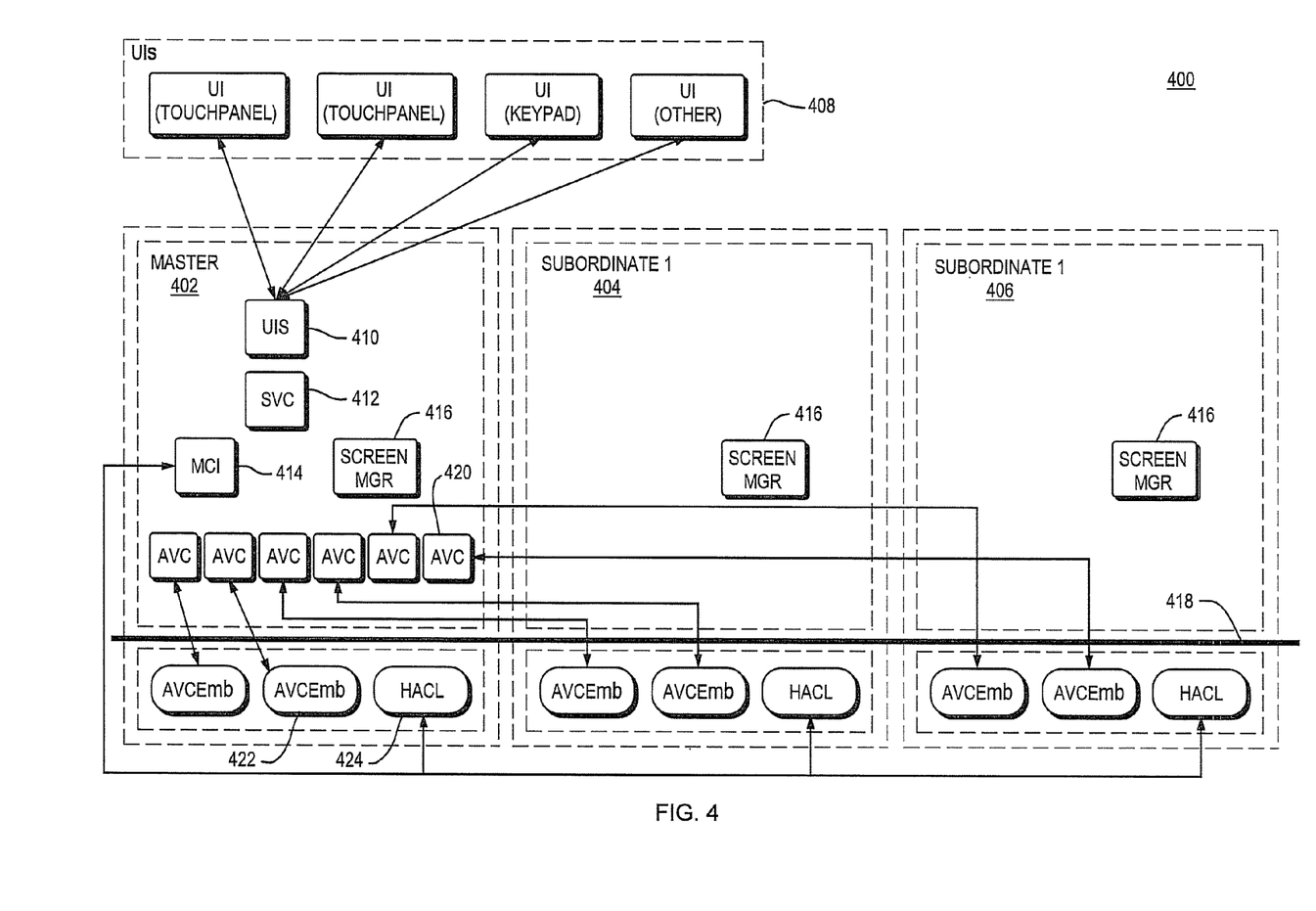
FIG. 4 is a block diagram showing particular higher level software processes which communicate among a master programmable multimedia controller and two subordinate programmable multimedia controllers.

FIG. 4 shows an embodiment in which particular higher level software processes communicate among a master programmable multimedia controller 402, two subordinate programmable multimedia controllers 404, 406 and user interfaces 408, all of which are part of an expanded control system 400. In an embodiment, such communications may be implemented with requests and responses that are based on the Simple Object Access Protocol (SOAP). Details regarding such software processes are described in related, co-pending application entitled "Programmable Multimedia Controller With Programmable Services" referenced above.

As shown, user interfaces 408 may include touchpanels, a keypad or other device which has appropriate functionality and connectivity to communicate with master PMC 402. Within master PMC 402, a user interface server (UIS) 410 is responsible for receiving commands or data (or both) transmitted by user interfaces 408 and responding appropriately. More specifically, UIS 410 maps a button press or other user interface action to a "service request" or message containing data on what the user wants to do (e.g., mute the television in a particular zone). UIS 410 also returns "state update" information to user interfaces 408 to effect appropriate realtime changes with respect to buttons, indicators and the like.

A Media Controller Interface (MCI), which is a piece of high-level software running on a general purpose computer that controls and coordinates the operations of the lower system layers for the purposes of media switch and processing is provided as MCI 414. MCI 414 operates in conjunction with a hardware abstraction control layer (HACL), which is a lower level piece of software running on the special purpose platform that takes the high level MCI commands and translates them to hardware-level requests (i.e. controls hardware).

HACLs 424, provides overall control of all audio and video processors and switches present within system 400. Screen managers 416 are processes that provide overall control of the screens displayed on touchpanels or other displays that may be interconnected with system 400.

In an embodiment, reference number 418 denotes a hierarchical boundary between those higher level processes, located above the boundary, which may run on the general purpose computer that is part of a master PMC, and those lower level software processes which may run on an embedded control processor. The system includes messaging between an Audio/Video Controller (AVC), which is a piece of high level software running on a general purpose computer that issues control commands to the devices that are being controlled by the PMC system and an Audio/Video Controller Embedded process (AVCEmb), which is a lower level piece of software running on the special purpose platform that relays control and acknowledgement messaging between the AVC and the device being controlled. In the illustrative embodiment, the messaging is done in this manner because control ports (RS232, IR, etc.) are located on special purpose hard ware.

More specifically, AVC process 420 and AVCEmb process 422 enable commands to be sent to and received from external devices (not shown) that may be connected to control ports. AVCEmb process 422 communicates directly with control ports located on the PMC in which that process is running. As shown, AVC processes 420 running in master PMC 402 communicate with AVCEmb processes 422 running in both master PMC 402 as well as subordinate PMCs 404 and 406. Through such communication, master PMC 402 is able to control a wide variety of external devices that may be connected to any control port in system 400.

The foregoing description has been directed to specific embodiments of this invention. It will be apparent, however, that other variations and modifications may be made to the described embodiments, with the attainment of some or all of their advantages. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. An expandable multimedia control system comprising:
a master programmable multimedia controller operable to execute one or more applications which control one or more devices that are interconnected with said expandable multimedia control system so as to provide one or more programmable services, said master programmable multimedia controller storing a configuration bundle that includes a list of first predetermined unique identifiers representing subordinate programmable multimedia controllers that are eligible to become part of said expandable multimedia control system but that are not yet connected to a network of said expandable multimedia control system;
a communication link operable to couple said master programmable multimedia controller and a subordinate programmable multimedia controller; and
said subordinate programmable multimedia controller having an associated second predetermined unique identifier, said subordinate programmable multimedia controller operable to indicate its availability to become part of said expandable multimedia control system by publishing said second predetermined unique identifier over said communication link to said master programmable multimedia controller, said master programmable multimedia controller operable to compare said list of first predetermined unique identifiers and said second predetermined unique identifier and establish a control relationship with said subordinate programmable multimedia controller in response to a unique identifier on said list of first predetermined unique identifiers matching said second predetermined unique identifier, to permit said subordinate programmable multimedia controller to become part of said expanded system.

2. The expandable multimedia control system as defined in claim 1, further comprising:
said subordinate programmable multimedia controller having as its predetermined unique identifier, a serial number stored in nonvolatile memory.

3. The expandable multimedia control system as defined in claim 1, wherein said subordinate programmable multimedia controller provides a coupling to a different zone than the master programmable multimedia controller.

4. The expandable multimedia control system as defined in claim 1 wherein said subordinate programmable multimedia controller provides additional control ports.

5. The expandable multimedia control system as defined in claim 4 wherein said additional control ports include at least one of RS-232, RS-422, RS-485, infra red (IR), relay, general purpose input/output (GPIO) or Ethernet ports.

6. The expandable multimedia control system as defined in claim 1 wherein said subordinate programmable multimedia controller provides additional audio processing or switching capacity.

7. The expandable multimedia control system as defined in claim 1 wherein said subordinate programmable multimedia controller provides video processing or switching capacity.

8. The expandable multimedia control system as defined in claim 1 wherein each programmable multimedia controller in the expandable multimedia control system includes a configuration bundle which notifies that particular programmable multimedia controller whether to identify itself as a master or a subordinate.

9. The expandable multimedia control system as defined in claim 1 wherein the expandable multimedia control system includes one or more user interfaces.

10. The expandable multimedia control system as defined in claim 9 wherein the user interfaces include at least one of a touch panel, key pad, or a touch pad.

11. The expandable multimedia control system as defined in claim 10 further comprising at least one user interface server located within the master programmable multimedia controller.

12. The expandable multimedia control system as defined in claim 1, further comprising:
said master programmable multimedia controller being configured to communicate with and control external devices connected to a control port in the expandable multimedia control system.

13. The expandable multimedia control system as defined in claim 1, wherein said communication link is a local area network (LAN).

14. The expandable multimedia control system as defined in claim 1, further comprising:
a plurality of subordinate programmable multimedia controllers coupled by said communication link, said subordinate programmable multimedia controllers each arranged to control respective devices in respective zones which correspond to different areas of a house.

15. The expandable multimedia control system as defined in claim 1, further comprising:
a plurality of subordinate programmable multimedia controllers that are connected by said communication link, said subordinate programmable multimedia controllers each being identified with one or more sets of device types, zone locations, and functionalities.

16. A method of adding a subordinate programmable multimedia controller to an expandable multimedia control system, comprising:
receiving, at a master programmable multimedia controller during an initial configuration of the master programmable multimedia controller prior to communication with a subordinate programmable multimedia controller, a configuration bundle including a list of unique identifiers representing subordinate programmable multimedia controllers that are eligible to become part of said expandable multimedia control system upon connection to a network of said expandable multimedia control system;
locating, by the master programmable multimedia controller, the subordinate programmable multimedia controller on the network;
receiving, at the master programmable multimedia controller, a unique identifier published by the subordinate programmable multimedia controller located on the network;
comparing the unique identifier published over the network with said list of unique identifiers representing subordinate programmable multimedia controllers that are eligible to become part of said expandable multimedia control system in the configuration bundle received during the initial configuration; and
establishing a control relationship with said subordinate programmable multimedia controller upon matching the its unique identifier published over the network with a unique identifier on said list, to permit said subordinate programmable multimedia controller to operate in the expandable multimedia control system.

17. The method of adding a subordinate programmable multimedia controller to an expandable multimedia control system as defined in claim 16, further comprising:
sharing portions of configuration information with said subordinate programmable multimedia controller permitted to operate in said expandable multimedia control system.

18. A non-transitory computer readable medium including program instructions for execution on a master programmable multimedia controller of an expandable multimedia control system, the program instructions when executed operable to:
establish a connection to a network;
locate a subordinate programmable multimedia controller on the network;
receive a unique identifier published by said located subordinate programmable multimedia controller over the network;
compare the unique identifier published over the network with a list of unique identifiers maintained on the master programmable multimedia controller, the list of unique identifiers representing subordinate programmable multimedia controllers that are eligible to become part of said expandable multimedia control system, the list of unique identifiers provided in a configuration bundle supplied to the master programmable multimedia controllers during an initial configuration prior to communication with said located subordinate programmable multimedia controller; and in response to the unique identifier published over the network matching a unique identifier on said list of unique identifiers, establish a control relationship with said subordinate programmable multimedia controller to add said subordinate programmable multimedia controller to said expandable multimedia control system.

19. The non-transitory computer readable medium as defined in claim 18, wherein the program instructions when executed are further operable to:

in response to the unique identifier not matching any unique identifier on said list of unique identifiers, ignoring said subordinate programmable multimedia controller.

20. The non-transitory computer readable medium as defined in claim 18, wherein the program instructions when executed are further operable to:

in response to establishment of the control relationship, share a portion of configuration information at said master programmable multimedia controller with said subordinate programmable multimedia controller.

21. The non-transitory computer readable medium as defined in claim 18, wherein the program instructions to determine further comprise program instructions that when executed are operable to:

receive the unique ID as a published device name of the subordinate programmable multimedia controller.

* * * * *

UNITED STATES PATENT AND TRADEMARK OFFICE
CERTIFICATE OF CORRECTION

PATENT NO. : 8,954,176 B2
APPLICATION NO. : 12/682335
DATED : February 10, 2015
INVENTOR(S) : Michael C. Silva It is certified that error appears in the above-identified patent and that said Letters Patent is hereby corrected as shown below:

In the Specification:
Col. 5, line 35 should read:
configuration bundle are needed by the subordinate PMC. Lastly, at In the Claims:
Claim 16, Col. 8, line 38 should read:
unique identifier published over the network with a Signed and Sealed this
Fourteenth Day of July, 2015

Michelle K. Lee
*Director of the United States Patent and Trademark Office*